US011009136B2

(12) United States Patent
Berkovitz et al.

(10) Patent No.: US 11,009,136 B2
(45) Date of Patent: May 18, 2021

(54) BIDIRECTIONAL CRYOGENIC FIRESAFE FLOATING BALL VALVE

(71) Applicant: Habonim Industrial Valves & Actuators Ltd., Galil Elion (IL)

(72) Inventors: Igor Berkovitz, Carmiel (IL); Yoel Hadar, Kiryat Shmona (IL); Ben Zion Zweig, Carmiel (IL)

(73) Assignee: Habonim Industrial Valves & Actuators Ltd., Galil Elion (IL)

( * ) Notice: Subject to any disclaimer, the term of this patent is extended or adjusted under 35 U.S.C. 154(b) by 24 days.

(21) Appl. No.: 16/406,036

(22) Filed: May 8, 2019

(65) Prior Publication Data

US 2020/0355276 A1   Nov. 12, 2020

(51) Int. Cl.
*F16K 5/20*   (2006.01)
*F16K 5/06*   (2006.01)

(52) U.S. Cl.
CPC ............ *F16K 5/201* (2013.01); *F16K 5/0689* (2013.01); *F16K 5/204* (2013.01); *F16K 5/205* (2013.01)

(58) Field of Classification Search
CPC .......... F16K 5/0689; F16K 5/20; F16K 5/201; F16K 5/204; F16K 5/205
USPC ...................................................... 251/175
See application file for complete search history.

(56) References Cited

U.S. PATENT DOCUMENTS

| | | | | |
|---|---|---|---|---|
| 3,533,597 A * | 10/1970 | Bolling | .................. | F16K 5/201 251/174 |
| 4,020,864 A * | 5/1977 | Church, Jr. | ............. | F16K 5/201 137/242 |
| 4,071,220 A * | 1/1978 | Iino | ........................ | F16K 5/0678 251/174 |
| 4,155,536 A * | 5/1979 | Saiki | ....................... | F16K 5/204 251/174 |
| 4,318,420 A * | 3/1982 | Calvert | ................. | F16K 5/0673 137/74 |
| 4,385,747 A * | 5/1983 | Renaud, Jr. | ........... | F16K 5/0668 251/315.01 |
| 4,671,308 A * | 6/1987 | Williams | .............. | F16K 5/0626 137/72 |
| 4,762,301 A * | 8/1988 | Wozniak | ............... | F16K 5/0642 251/171 |
| 4,911,408 A * | 3/1990 | Kemp | ................... | F16K 5/0673 251/174 |
| 5,419,532 A * | 5/1995 | Fan | ....................... | F16K 5/0673 251/315.08 |
| 7,559,531 B2 * | 7/2009 | Thomas | ................ | F16K 5/0642 251/180 |
| 8,820,706 B2 * | 9/2014 | Kawauchi | ............... | F16K 5/205 251/180 |

(Continued)

*Primary Examiner* — David Colon-Morales
(74) *Attorney, Agent, or Firm* — A.C. Entis-IP Ltd.; Allan C. Entis (57) ABSTRACT

A firesafe bidirectional floating ball valve comprising: a housing; first and second annular seats that hold between them a ball that is rotatable to open and close the valve to fluid flow; an annular spring on one side of the ball that operates to seal both of the seats to the ball; and an annular ridge coaxial with the first seat; wherein with the valve closed, net pressure on the ball in a direction from the second fluid flow port to the first fluid flow port operates to displace the ball and apply force to the first annular seat that closes a narrow clearance space between the ball and the first annular seat.

21 Claims, 8 Drawing Sheets

(56) References Cited

U.S. PATENT DOCUMENTS

| | | | | |
|---|---|---|---|---|
| 8,978,691 | B2* | 3/2015 | Avdjian | F16K 25/02 |
| | | | | 137/315.19 |
| 9,140,410 | B2* | 9/2015 | Malnou | F16K 27/067 |
| 9,915,359 | B2* | 3/2018 | Ricard | F16K 5/0673 |
| 10,197,168 | B1* | 2/2019 | Whitlow | F16K 5/0689 |
| 10,228,065 | B2* | 3/2019 | Gaburri | F16K 27/067 |
| 10,544,868 | B2* | 1/2020 | Bell | F16K 5/201 |
| 2003/0111631 | A1* | 6/2003 | Gosling | F16K 5/201 |
| | | | | 251/315.01 |
| 2014/0203203 | A1* | 7/2014 | Scattini | F16K 5/201 |
| | | | | 251/317 |
| 2015/0300509 | A1* | 10/2015 | He | F16K 5/201 |
| | | | | 251/174 |
| 2018/0087675 | A1* | 3/2018 | Balan | F16K 5/201 |
| 2019/0154161 | A1* | 5/2019 | Kazama | F16K 5/201 |

\* cited by examiner

BIDIRECTIONAL CRYOGENIC FIRESAFE FLOATING BALL VALVE

TECHNICAL FIELD

Embodiments of the disclosure relate to cryogenic floating ball valves that may operate to control flow of cryogenic fluids.

BACKGROUND

A typical ball valve comprises a housing having a fluid inlet, upstream port opposite a fluid outlet, downstream port, and a ball having a through hole formed along a diameter of the ball that is held in an internal cavity of the housing between annular sealing gaskets, referred to as "seats". The ball may be rotated to align the through hole with the inlet and outlet ports to open the valve so that fluid may flow between the ports through the valve and be rotated to align the through hole facing away from the ports to close the valve and block fluid flow through the valve. The ball is coupled to a shaft referred to as a stem that extends from the internal cavity of the housing to outside of the housing. Rotating the stem, typically thorough, a quarter turn of 90°, rotates the ball between open and closed orientations of the ball that respectively open and close the valve.

In a trunnion mounted ball valve, the ball is mounted to a trunnion in the housing cavity that shares a common axis of rotation with the valve stem and stabilizes the position of the ball in the cavity against displacement in directions parallel to fluid flow through the valve. In a floating ball valve, the ball is absent trunnion support and exhibits displacement parallel to direction of fluid flow, which aids in sealing the valve against fluid leakage through the valve when the valve is closed. When closing the valve, fluid pressure displaces the ball in a downstream flow direction to press the ball to the downstream seat that holds the ball and "dynamically" seal the ball to the downstream seat and thereby close and seal the valve against fluid flow.

In a cryogenic floating ball valve operated to control flow of cryogenic fluids, the ball is generally formed having a pressure release hole through which gas that evaporates from cryogenic fluid trapped in the cavity housing may escape without generating dangerous and potentially explosive gas overpressure in the valve. The valve operates to dynamically seal the ball effectively against only a given one of the seats that holds the ball. The valve is "monodirectional" and properly closes and seals to block fluid flow for only that direction of fluid flow through the valve for which the given one seat is downstream and when closed the pressure release hole faces upstream.

SUMMARY

An aspect of an embodiment of the disclosure relates to providing a firesafe bidirectional cryogenic floating ball valve operational to control fluid flow selectively in either direction of opposite directions of fluid flow through the valve. In an embodiment the valve, optionally referred to as a BIFLOW valve or simply BIFLOW, is configured so that each of the annular seats in the valve may be selected to be a downstream seat for which when the valve is closed pressure of fluid in the valve effectively seals the ball against the seat to block fluid flow through the valve. The seat which is not selected as a downstream seat operates as an upstream seat and responds to pressure of gas generated by evaporation of cryogenic fluid trapped in the valve cavity by deforming to enable gas to vent upstream from between the seat and the ball. In an embodiment the housing comprises at least one pressure ridge configured to cooperate with a seat and facilitate operation of the seat as a downstream or upstream seat. A relatively narrow clearance space separates an end surface of the pressure ridge from the seat. When the seat operates as a downstream seat the pressure ridge facilitates sealing the seat to the ball. When the seat operates as an upstream seat the clearance space operates to facilitate venting of overpressure gas.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

In the detailed description below, features of the construction of a BIFLOW firesafe valve in accordance with an embodiment of the disclosure are discussed with reference to FIGS. 1A-2D. Details of configurations of components of a BIFLOW and sealing of a BIFLOW for states in which the BIFLOW is open to fluid flow and closed to fluid flow are discussed with reference to FIG. 3-FIG. 4D.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

Figures 1A, 1B, 1C:
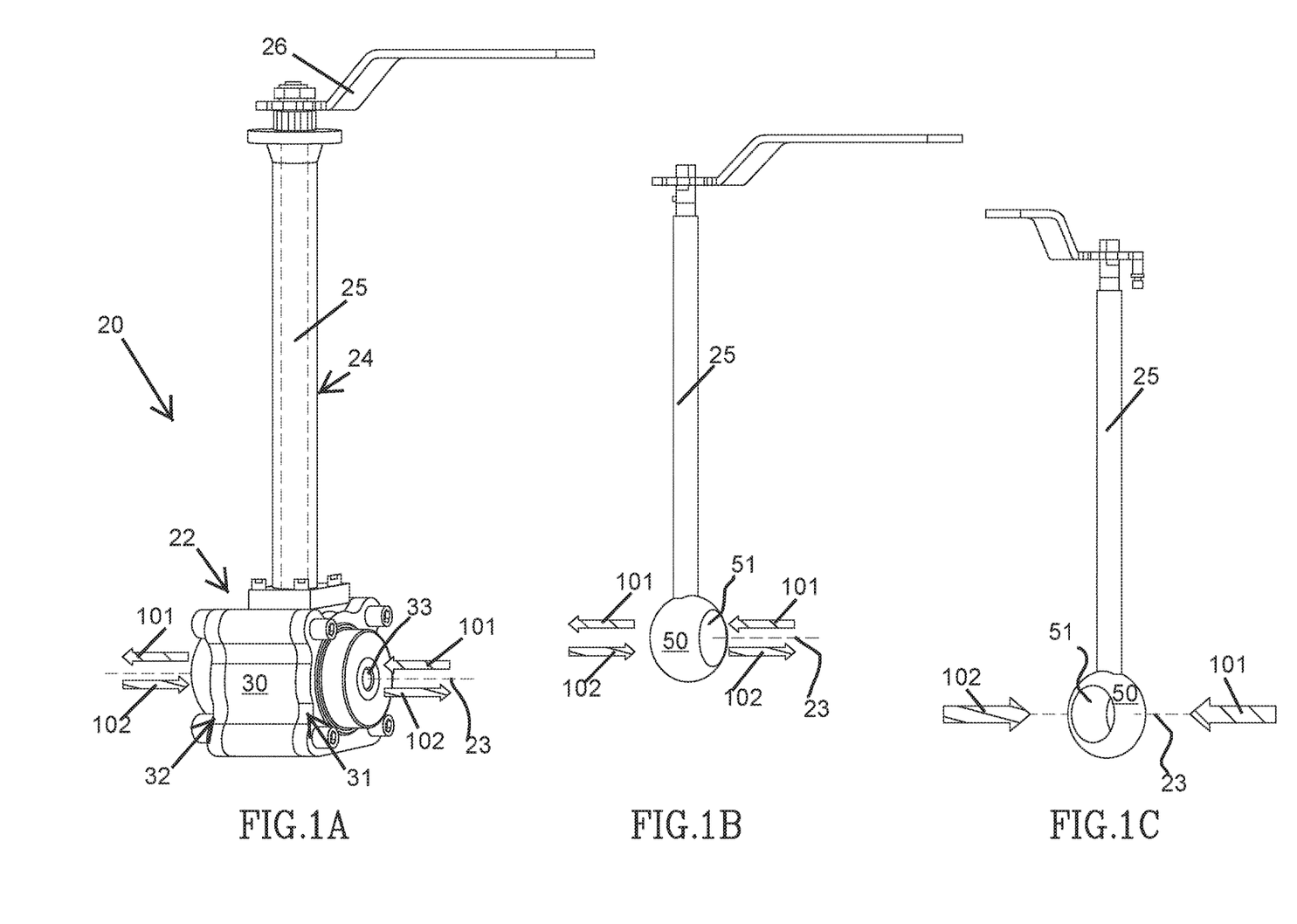
FIG. 1A schematically shows a perspective view of a BIFLOW valve and directions of flow of cryogenic fluid through the valve for which the valve is operational, in accordance with an embodiment of the disclosure.
FIGS. 1B and 1C schematically show perspective views of a ball in the BIFLOW valve shown in FIG. 1A, in open and closed orientations respectively for which the BIFLOW valve is open and closed to fluid flow through the valve, in accordance with an embodiment of the disclosure.

FIG. 1A shows a perspective view of a BIFLOW valve 20 that functions to control fluid flow through the valve selectively in either of two opposite directions, in accordance with an embodiment of the disclosure. BIFLOW valve 20 optionally comprises a valve housing 22 having a central body 30 and first and second end-caps 31 and 32 respectively that are coupled and sealed to the central body to close and seal the central body against fluid leakage. First and second end-caps 31 and 32 are formed having first and second fluid flow ports 33 and 34 respectively through which fluid carried by pipes coupled to the fluid flow ports may flow into and/or flow out from housing 22 along an axis 23 of the housing. In the perspective of FIG. 1A only first fluid flow port 33 is shown. A bonnet 24 coupled and sealed against fluid leakage from central body 22 extends from the central body and houses a stem 25 shown in dashed lines that is attached to a handle 26. Stem 25 is coupled to a ball 50, schematically shown in FIGS. 1B and 1C of BIFLOW 20, that is housed in housing 22. Operating handle 26 to rotate stem 25 rotates ball 50 to open the valve to fluid flow or to close the valve to fluid flow through BIFLOW 20.

Flow into and out from BIFLOW 20 along axis 23 in a first direction through the valve is schematically represented by a pair of block arrows 101. Flow along the axis through the valve in a second direction opposite the first direction is schematically represented by a set of block arrows 102. FIG. 1B schematically shows ball 50 rotated to orient a through hole 51 formed in the ball so that the through hole is parallel to axis 23 and facing fluid flow ports 33 and 34 to open BIFLOW valve 20 and enable fluid flow through BIFLOW. FIG. 1C schematically shows ball 50 rotated to orient through hole 51 perpendicular to axis 23 and facing away from fluid flow ports 33 and 34 to block fluid flow 101 and/or 102 through BIFLOW.

Figure 2A:
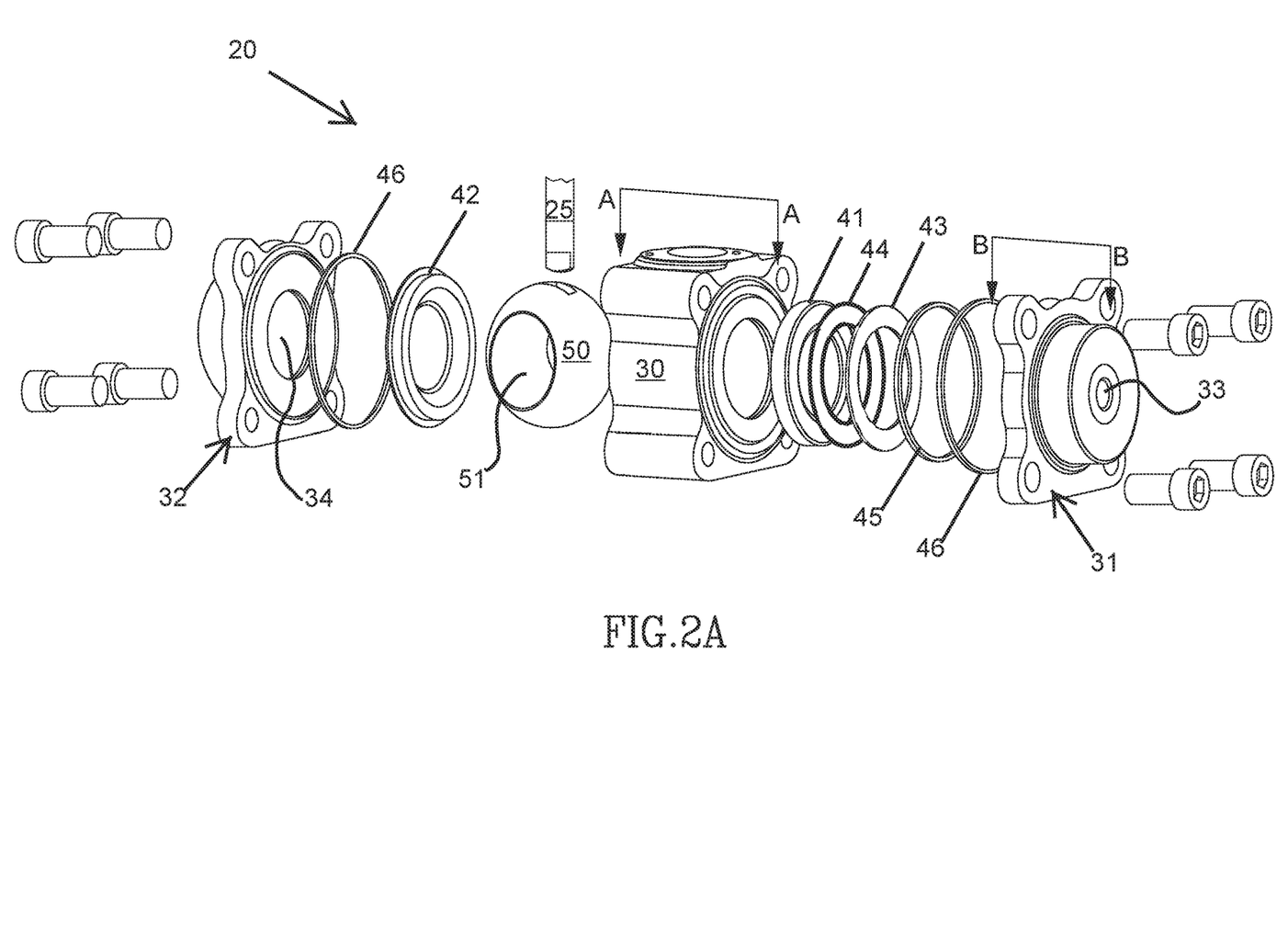
FIG. 2A schematically shows an exploded view of a BIFLOW valve, in accordance with an embodiment of the disclosure.
Figure 2B:
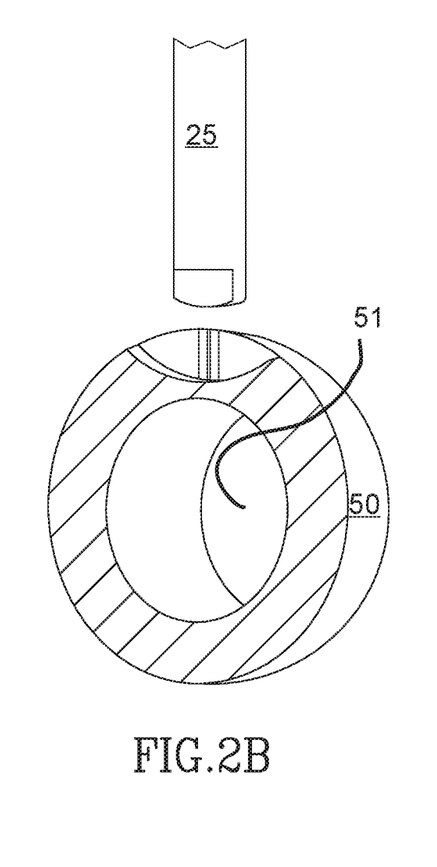
FIG. 2B schematically shows a perspective cutaway view of the ball in the BIVALVE shown in FIG. 2A that shows a cross section of the ball, in accordance with an embodiment of the disclosure.
Figure 2C:
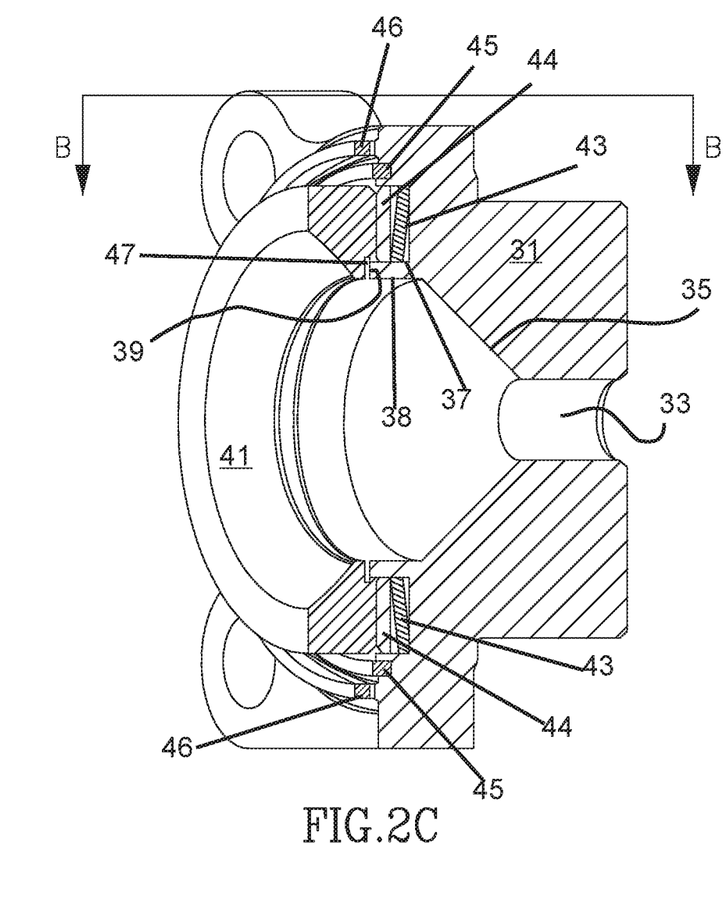
FIG. 2C schematically shows a perspective cutaway view of an end-cap that closes the body of the BIFLOW shown in FIG. 2A, and shows a cross section of the end-cap and an associated seat of the BIFLOW, in accordance with an embodiment of the disclosure.

FIG. 2A schematically shows an exploded view of BIFLOW 20 that shows in addition to central body 30, end-caps 31 and 32 and ball 50 of BIFLOW 20, internal components of BIFLOW. In an embodiment, the internal components comprise: first and second seats 41 and 42 configured to hold ball 50; an annular spring 43 and contact annulus 44 that seat in first end-cap 31 and operate to maintain ball 50 securely held between seats 41 and 42; a body seal 45 and a high temperature firesafe seal 46 that seal end-cap 31 to central body 30; and high temperature firesafe seal 46 that seals end-cap 32 to central body 30. FIG. 2B schematically shows a perspective cutaway of ball 50 showing a cross section of the ball, through hole 51, and how stem 25 couples to the ball. FIG. 2C schematically shows a perspective cutaway image that shows cross-sections in a plane B-B indicated in FIG. 2A of first end-cap 31 seated with first seat 41, annular spring 43, contact annulus 44, body seal 45 and high temperature firesafe seals 46 in accordance with an embodiment. Annular spring 43 and contact annulus 44 are optionally received in a recess 37 formed in first end-cap 31. Recess 37 may be bounded by a ridge 38, optionally referred to as a pressure ridge 38, that may form part of a wall 35 that delimits first fluid flow port 33 of first end-cap 31 and housing 22.

Figure 2D:
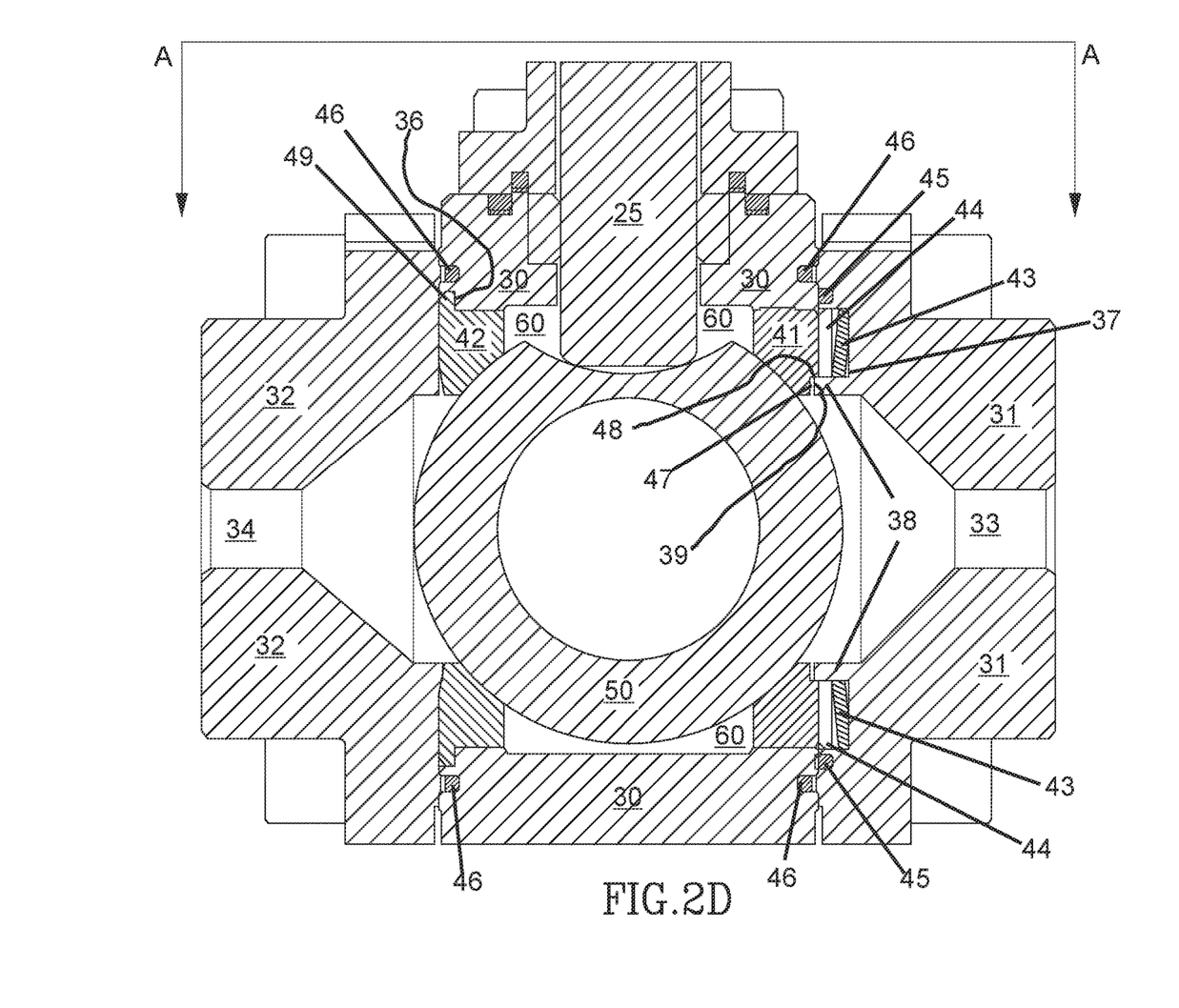
FIG. 2D schematically shows a cross-section of the BIVALVE shown in FIG. 2A in accordance with an embodiment of the disclosure.

FIG. 2D schematically shows an enlarged cross section view in a plane A-A indicated in FIG. 2A of housing 22 when BIFLOW valve 20 is assembled and ball 50 oriented so that BIFLOW valve is closed to fluid flow. The cross section shows first and second end-caps 31 and 32 mounted to central body 30 of housing 22 and ball 50 held between first and second seats 41 and 42 in a cavity 60 of housing 22. Annular spring 43 presses contact annulus 44 to first seat 41 to maintain ball 50 firmly held resiliently between first and second seats 41 and 42. Pressure ridge 38 that bounds recess 37 extends towards ball 50 and first seat 41 to be received in a step recess 48 formed in first seat 41 optionally leaving a small clearance space 47 between an end 39 of pressure ridge 38 and first seat 41 when BIFLOW 20 is not subject to fluid pressure applied to ball 50 from fluid in second end-cap 32. Second seat 42 is optionally formed having an annular ridge 49 that seats in a recess 36 of central body 30 and is compressed between second end-cap 32 and the central body 30. Ridge 49 operates to prevent fluid leakage into or out from cavity 60 between an outer surface of seat 42 and central body 30. In an embodiment firesafe seal 46 and a body seal 45 seal first end-cap 31 to central body 30 and a body seal 45 seals second end-cap 32 to central body 30.

Figure 3:
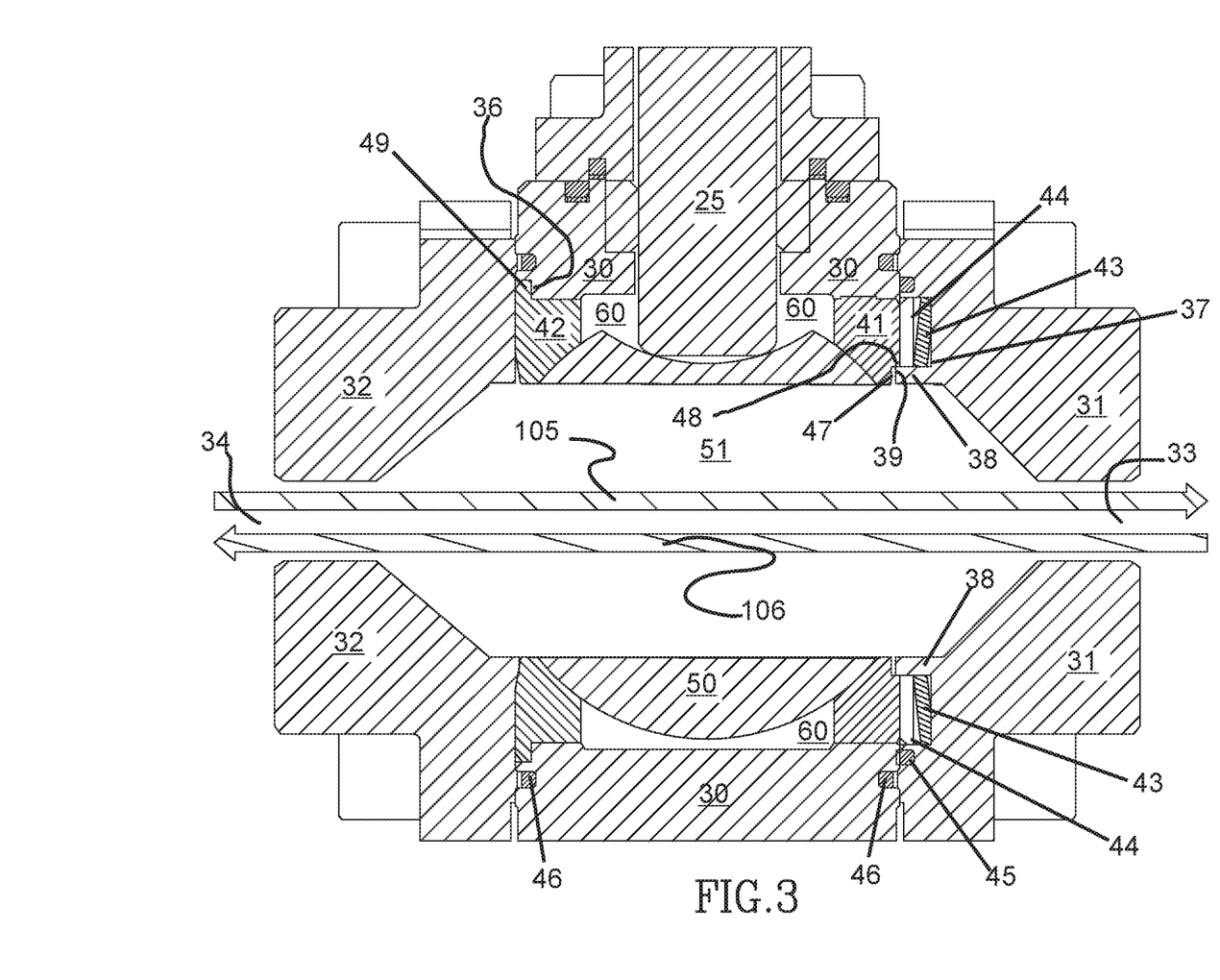
FIG. 3 schematically shows a cross section of the BIFLOW when the BIFLOW is open and enabling fluid flow through the BIFLOW, in accordance with an embodiment of the disclosure.

FIG. 3 schematically shows BIFLOW valve 20 with ball 50 rotated to open the valve to fluid flow in a direction indicated by a block arrow 105 and referred to by the label 105 or in a direction indicated by a block arrow 106 opposite to direction 105. Ball 50 is firmly held between seats 41 and 42 and clearance space 47 between pressure ridge 38 of first end-cap 31 and first seat 41 is open.

Figure 4A:
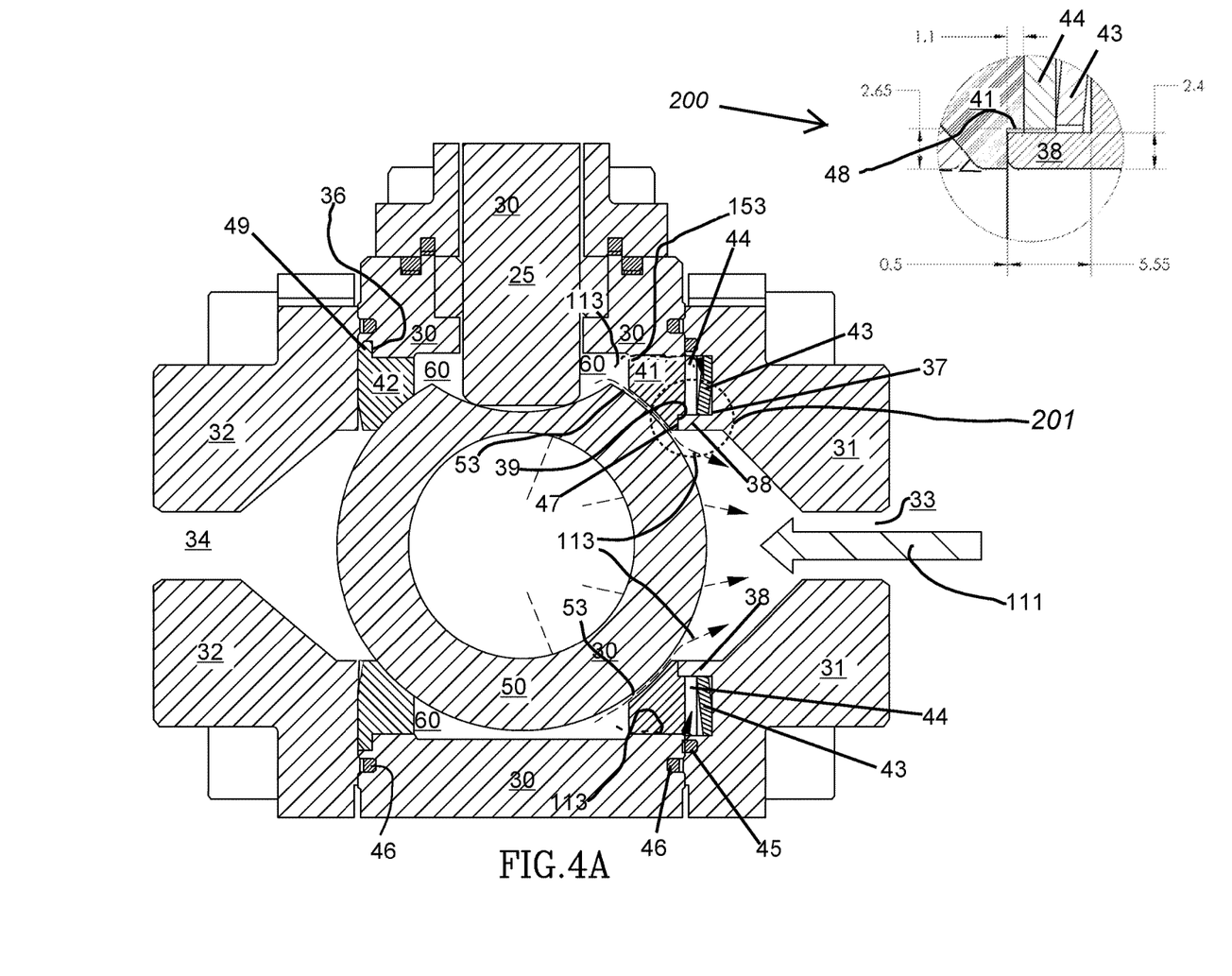
FIG. 4A schematically shows the BIFLOW shown in FIG. 3 when the BIFLOW is closed to fluid flow through the BIFLOW for a first direction of fluid flow through the BIFLOW, in accordance with an embodiment of the disclosure.

FIG. 4A schematically shows BIFLOW 20 when BIFLOW is closed to fluid flow and assuming that first end-cap 31 is connected to a source (not shown) of cryogenic fluid that operates to flow cryogenic fluid through BIFLOW 20 via first fluid flow port 33 in a direction indicated by a block arrow 111. Pressure on ball 50 generated by stationary cryogenic fluid from the source residing in first fluid flow port 33 operates to displace ball 50 towards second seat 42 and increase force that seals the ball to the second seat 42 compared to force that operates to seal ball 50 to first seat 41 and aids in sealing BIFLOW 20 against cryogenic fluid flow through BIFLOW.

Gas generated by evaporation of residual cryogenic fluid trapped in cavity 60 when BIFLOW 20 is closed generates gas pressure in the cavity that operates to break the seals between ball 50 and both the first and second seats 41 and 42. However, the gas pressure operates to close clearance space 47 and compress annular spring 43 and thereby promote deformation of first seat 41, as schematically shown in FIG. 4A, which shows an absence of the clearance shown in FIG. 3. The deformation of first seat 41 in combination with increased pressure between second seat 42 and ball 50 tends to break the seal between first seat 41 and the ball, and/or first seal 41 and central body 30 before the seal between second seat 42 and the ball breaks. As a result, gas generated by evaporation of cryogenic fluid vents upstream in a direction opposite to that indicated by block arrow 111 through easement of the seal between ball 50 and first seat 41 and/or easement of the seal between central body 30 and first seat 41. Easement of the seal between ball 50 and seat 41 is indicated by separations 53 between first seat 41 and ball 50. Easement of seals between seat 41 and central body 30 are schematically indicated by separations 153. Venting of gas upstream via the easements 53 and 153 is schematically represented by dashed arrows 113.

Figure 4B:
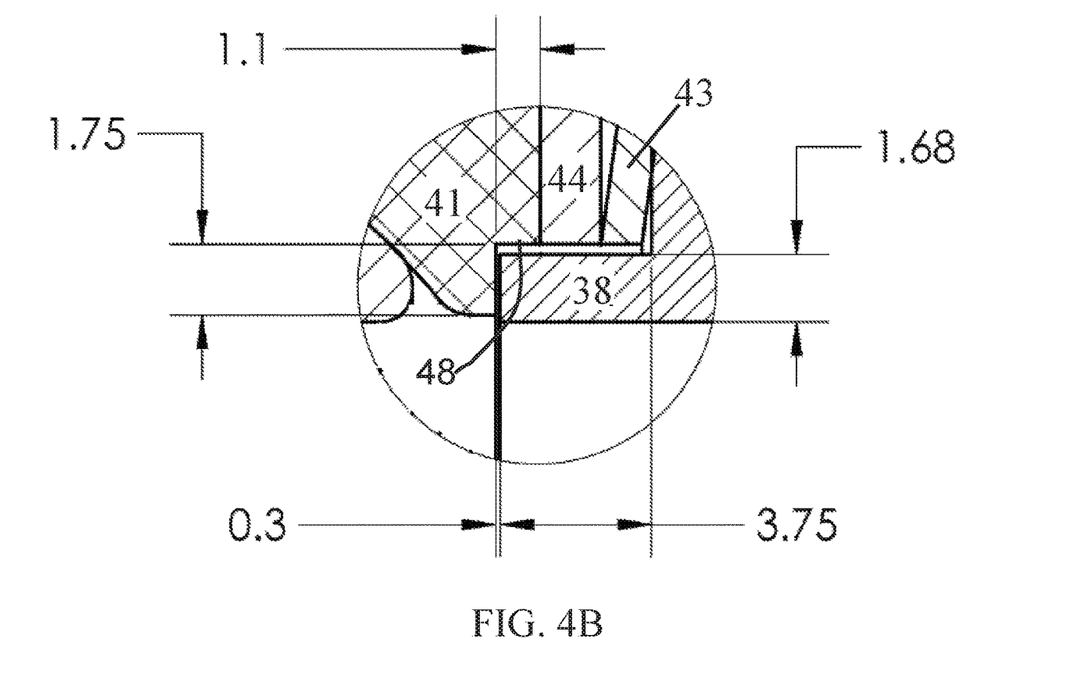
FIGS. 4B and 4C show optionally dimensions for the pressure ridge for different diameter balls, in accordance with an embodiment of the disclosure.
Figure 4C:
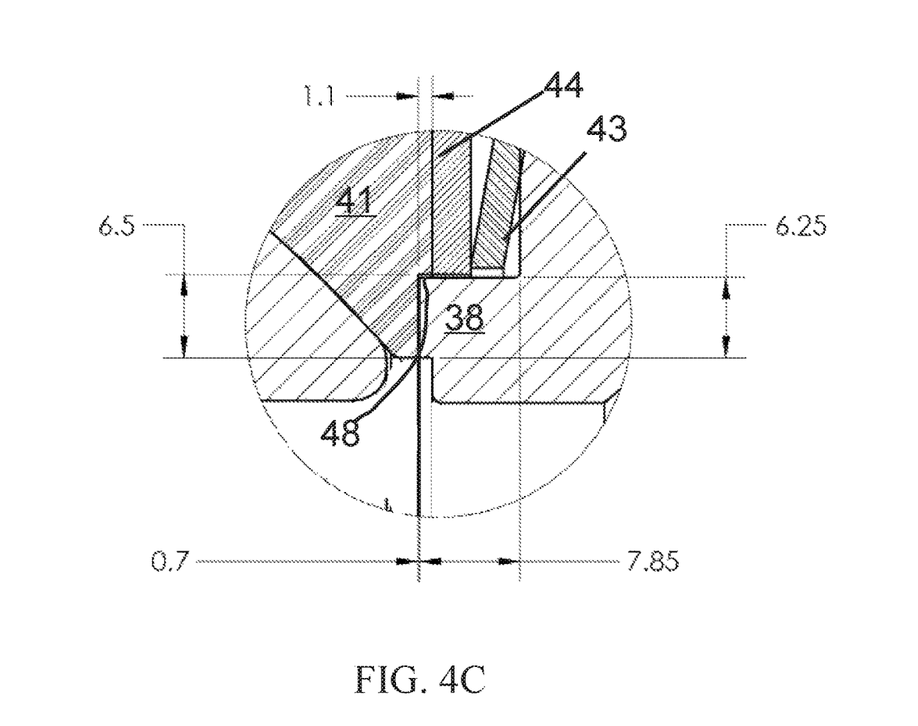

Dimensions relevant to the functioning of ridge 38 for a 2-inch BIFLOW firesafe valve comprising a ball 50 having a diameter of about 63 mm (millimeters) in accordance with an embodiment of the disclosure are given in an inset 200, which shows an enlarged image of a region 201 in FIG. 4A. The ridge may have a substantially rectangular cross-section optionally having length equal to about 5.55 mm and width equal to about 2.4 mm. Clearance space 47 may have a width in a direction of the length of ridge 38 equal to about 0.5 mm. FIGS. 4B and 4C show optional dimensions for ridge 38 for 1-inch and 6-inch BIFLOW firesafe valves respectively. The 1-inch and 6-inch BIFLOW valves may comprise balls having diameters equal to about 35 mm and about 180 mm respectively. For the 1-inch valve width of the ridge may be equal to about 1.68 mm and clearance space may be equal to about 0.3 mm. For the 6-inch valve width of the ridge may be equal to about 6.25 mm and the clearance space may be equal to about 0.7 mm.

Whereas the above description describes operation of seat 41 and ridge 38 when a net pressure operating on ball 50 is in a direction indicated by fluid flow block arrow 111 similar considerations apply in an absence of net pressure on ball 50. Upon closure of BIFLOW 20 to fluid flow in a direction 111 explosive pressure bleeds upstream through seals provided by first seat 41.

Figure 4D:
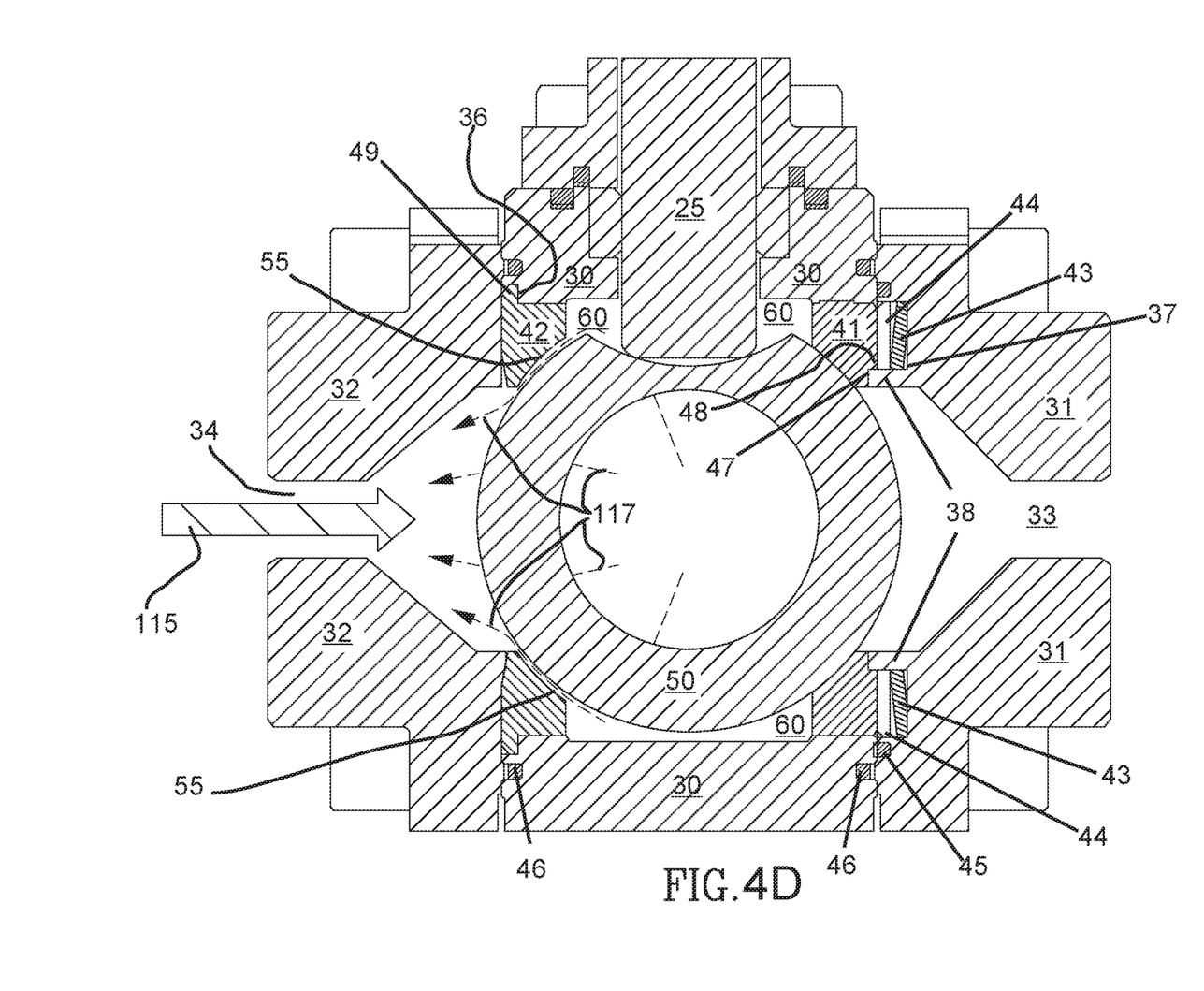
FIG. 4D schematically shows the BIFLOW shown in FIG. 4A when the BIFLOW is closed to fluid flow through the BIFLOW for a second direction of fluid flow through the BIFLOW opposite to the direction of fluid flow shown in FIG. 4A, in accordance with an embodiment of the disclosure.

In contrast to the scenario shown in FIG. 4A, FIG. 4D schematically shows BIFLOW 20 when BIFLOW is closed to fluid flow and assuming that second end-cap 32 is connected to a source (not shown) of cryogenic fluid that operates to flow cryogenic fluid through BIFLOW 20 via first fluid flow port 34 in a direction indicated by a block arrow 115 that is opposite to the direction indicated by block arrow 111 in FIG. 4A. Pressure on ball 50 generated by stationary cryogenic fluid from the source residing in second fluid flow port 34 operates to displace ball 50 towards first seat 41 and increase force that seals the ball to the first seat compared to force that operates to seal ball 50 to second seat 42 and aids in sealing BIFLOW against cryogenic fluid flow through BIFLOW. Displacement towards first seat 41 operates, in accordance with an embodiment of the disclosure, as schematically shown in FIG. 4D, to close clearance space 47 shown in FIG. 2D and FIG. 3, and cause pressure ridge 38 to press onto first seat 41. Optionally, displacement of ball 50 in direction of first seat 41 is greater than a width of clearance space 47 between the first seat and an end 39 of pressure ridge 38 so that pressure ridge 38 compresses the first seat in a region of the seat at which the pressure ridge contacts the seat to provide a relatively strong seal between ball 50 and first seat 41. Use of a pressure ridge similar to pressure ridge 38 substantially improves valve leakage pressure ratings for a BIFLOW valve and first seat in accordance with an embodiment similar respectively to BIFLOW valve 20 and first seat 41 for flow in a direction indicated by block arrow 115. Improvement in pressure ratings for a BIFLOW valve having a pressure ridge similar to that of BIFLOW 20 in comparison to pressure rating for a similar floating ball valve absent pressure ridge 38 may be substantial.

For example, pressure rating for a BIFLOW valve in accordance with an embodiment similar to BIFLOW valve 20 and flow direction 115 exhibited a pressure rating equal to about 100 bar. For comparison a floating ball valve similar to BIFLOW valve 20 but absent pressure ridge 38 exhibited a pressure rating in direction 115 equal to about 4 bar. The BIFLOW valve in accordance with an embodiment exhibited about a 25-fold improvement in pressure rating in direction 115, in comparison to the floating ball valve absent pressure ridge 38.

Furthermore, in contradistinction to the situation shown in FIG. 4A gas pressure generated by evaporation of residual cryogenic fluid trapped in cavity 60 operates to deform and break the seal between second seat 42 and ball 50 before the seal between first seat 41 and the ball breaks. As a result, gas generated by evaporation of cryogenic fluid vents upstream in a direction opposite to that indicated by block arrow 115 through easement of the seal between ball 50 and second seat 42. Easement of the seal between second seal and ball 50 is indicated by separation 55 between second seat 42 and ball 50, and venting of gas upstream is schematically represented by dashed arrows 117.

There is therefore provided in accordance with an embodiment of the disclosure a firesafe bidirectional floating ball valve comprising: a housing having a cavity and first and second fluid flow ports through which fluid flows selectively in either direction from the first to the second or the second to the first fluid ports when the valve is open; a ball formed having a through hole for passage of fluid housed in the cavity and rotatable to open the valve and allow fluid flow through the fluid ports and cavity and to close the valve and block fluid flow through the fluid ports and cavity; first and second annular seats that hold and seal the ball between them; and an annular ridge coaxial with the first seat and having an end surface spaced from the first seat by a narrow clearance space; wherein with the valve closed net pressure on the ball in a direction from the second fluid flow port to the first fluid flow port operates to displace the ball and apply force to the first annular seat that closes the clearance space.

Optionally, the housing comprises a central body and first and second end-caps that are attached and sealed to the central body and have formed therein the first and second fluid flow ports respectively. Optionally, at least one firesafe seal seals each of the first and second end-caps to the central body. Alternatively, or additionally, the ridge is optionally formed on the first end-cap. Optionally, the ridge forms part of a wall that delimits the first fluid flow port. Alternatively, or additionally, the first seat is formed having a step which receives the ridge. Alternatively, or additionally, the ridge bounds an annular recess formed in the first end-cap. Optionally, the valve comprises an annular spring that seats in the recess. Optionally, the valve comprises an annular contact plate that seats in the recess which the annular spring resiliently presses to the first seat.

In an embodiment, the second annular seat comprises an annular ridge that is compressed between the second end-cap and the central body, and operates to seal the end-cap to the central body.

In an embodiment, the ball has a diameter equal to about 63 mm and the pressure ridge has a width equal to about 2.4 mm. Optionally, the clearance space is equal to about 0.5 mm.

In an embodiment, the ball has a diameter equal to about 35 and the pressure ridge has a width equal to about 1.68 mm. Optionally, the clearance space is equal to about 0.3 mm.

In an embodiment, the ball has a diameter equal to about 180 and the pressure ridge has a width equal to about 6.25 mm. Optionally, the clearance space is equal to about 0.7 mm.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

The invention claimed is:

1. A firesafe bidirectional floating ball valve comprising:
a housing having a cavity and first and second fluid flow ports through which fluid flows selectively in either direction from the first to the second or the second to the first fluid ports when the valve is open; wherein the housing comprises a central body and first and second end-caps that are attached and sealed to the central body and have formed therein the first and second fluid flow ports respectively;
a ball formed having a through hole for passage of fluid housed in the cavity and rotatable to open the valve and allow fluid flow through the fluid ports and the cavity and to close the valve and block fluid flow through the fluid ports and cavity;
first and second annular seats that face each other from opposite first and second sides respectively of the ball and hold the ball between them;
an annular pressure ridge coaxial with the first seat that is located on the first side and has an end surface spaced from the first seat by a narrow clearance space; and
an annular spring located only on the first side that is coaxial with the first seat and operates to press and seal both the first and second annular seats to the ball; wherein
with the valve closed net pressure on the ball in a direction from the second fluid flow port to the first fluid flow port operates to displace the ball and apply force to the first annular seat that closes the clearance space.

2. The valve according to claim 1 wherein at least one firesafe seal seals each of the first and second end-caps to the central body.

3. The firesafe bidirectional floating ball valve according to claim 1 wherein the valve is a cryogenic valve operable to control flow of a cryogenic fluid.

4. The valve according to claim 1 wherein the pressure ridge is formed on the first end-cap.

5. The valve according to claim 4 wherein the pressure ridge forms part of a wall that delimits the first fluid flow port.

6. The valve according to claim 4 wherein the first seat is formed having a step which receives the pressure ridge.

7. The valve according to claim 4 wherein the pressure ridge bounds an annular recess formed in the first end-cap.

8. The valve according to claim 7 wherein the annular spring seats in the recess.

9. The valve according to claim 8 and comprising an annular contact plate that seats in the recess which the annular spring resiliently presses to the first seat.

10. The valve according to claim 1 wherein the ball has a diameter equal to about 63 mm and the pressure ridge has a width equal to between about 2.0 mm (millimeters) to about 3.0 mm.

11. The valve according to claim 10 wherein the ball has a diameter equal to about 63 mm and the pressure ridge has a width equal to about 2.4 mm.

12. The valve according to claim 10 wherein the clearance space is equal to between about 0.3 mm to 0.7 mm.

13. The valve according to claim 1 wherein the ball has a diameter equal to about 35 mm and the pressure ridge has a width equal to between about 1.5 mm to about 2.0 mm.

14. The valve according to claim 13 wherein the ball has a diameter equal to about 35 mm and the pressure ridge has a width equal to about 1.68 mm.

15. The valve according to claim 13 wherein the clearance space is equal to between about 0.2 mm to about 0.6 mm.

16. The valve according to claim 15 wherein the clearance space is equal to about 0.3 mm.

17. The valve according to claim 1 wherein the ball has a diameter equal to about 180 mm and the pressure ridge has a width equal to between about 4.5 mm to about 7.0 mm.

18. The valve according to claim 17 wherein the ball has a diameter equal to about 180 mm and the pressure ridge has a width equal to about 6.25 mm.

19. The valve according to claim 17 wherein the clearance space is equal to between about 0.5 mm to about 1.0 mm.

20. A firesafe bidirectional floating ball valve comprising:
a housing having a cavity and first and second fluid flow ports through which fluid flows selectively in either direction from the first to the second or the second to the first fluid ports when the valve is open and comprising a central body and first and second end-caps attached and sealed to the central body that have formed therein the first and second fluid flow ports respectively;
a ball formed having a through hole for passage of fluid housed in the cavity and rotatable to open the valve and allow fluid flow through the fluid ports and cavity and to close the valve and block fluid flow through the fluid ports and cavity;
first and second annular seats that hold and seal the ball between them wherein the second annular seat comprises an annular ridge that is compressed between the second end-cap and the central body and operates to seal the end-cap to the central body; and
an annular ridge coaxial with the first seat and having an end surface spaced from the first seat by a narrow clearance space; wherein with the valve closed net pressure on the ball in a direction from the second fluid flow port to the first fluid flow port operates to displace the ball and apply force to the first annular seat that closes the clearance space.

21. The firesafe bidirectional floating ball valve according to claim 20 wherein the valve is a cryogenic valve operable to control flow of a cryogenic fluid.

* * * * *